United States Patent Office 3,558,581
Patented Jan. 26, 1971

3,558,581
PROCESS FOR THE MANUFACTURE OF POLYVINYLMETHYLAMINES
Claus Beermann, Neu-Isenburg, Horst Schnabel, Hofheim, Taunus, and Dieter Ulmschneider, Frankfurt am Main, Germany, assignors to Farbwerke Hoechst Aktiengesellschaft vormals Meister Lucius & Bruning, Frankfurt am Main, Germany, a corporation of Germany
No Drawing. Filed Oct. 11, 1968, Ser. No. 766,942
Claims priority, application Germany, Oct. 20, 1967, P 17 20 737.3
Int. Cl. C08f 3/84, 3/86, 3/90
U.S. Cl. 260—89.7                    3 Claims

ABSTRACT OF THE DISCLOSURE

Poly-N-vinyl-N-methylamine and copolymers of N-vinyl-N-methylamine with compounds polymerizable under the action of a free radical liberating catalyst are produced by hydrolysis of homo- or copolymers of N-vinyl-N-methylformamide with mineral acids.

---

The present invention relates to the manufacture of polyvinylmethylamines.

Because of the impossibility to prepare monomeric N-vinyl-N-methylamine, poly-N-vinyl-N-methylamine cannot be produced by polymerization of the monomer. The same applies to polymers with vinylmethylamine structural units in the polymer chain.

It has been proposed in British patent specification 1,082,016 to produce polymers of N-vinyl-N-methylacetamide by polymerizing the monomer under the action of a free radical liberating catalyst. Water-soluble poly-N-vinyl-N-methylamine is obtained by acid hydrolysis of the poly-N-vinyl-N-methylacetamide at elevated temperatures.

The present invention provides a process for the manufacture of poly-N-vinyl-N-methylamines by subjecting water-soluble homo- or copolymers of N-vinyl-N-methylformamide to an acid hydrolysis at a temperature in the range of from about 50° C. to about 120° C.

To carry out the hydrolysis strong mineral acids are used, for example hydrochloric acid, nitric acid, hydrobromic acid, sulfuric acid and phosphoric acid. The desired degree of hydrolysis can be readily adjusted by varying the acid concentration. By the process of the invention poly-N-vinyl-N-methylamine and N-vinyl-N-methyl-amine/N-vinyl-N-methylformamide copolymers of any composition can be produced. The degree of hydrolysis depends, not only on the acid concentration, but also on the temperature and time of reaction.

When operating according to the process of the invention the products of hydrolysis are generally obtained in the case of the hydrolysis with sulfuric acid. When for hy- the dissolved state. An exception occurs particularly in drolysis sulfuric acid is used the concentration of which is below 15 to 20% by weight, the products of hydrolysis of the poly-N-vinyl-N-methylformamide precipitate if the content of basic nitrogen exceeds about 10% by weight, i.e. when more than 51% of the amide groups are hydrolyzed. The products obtained are again soluble in sulfuric acid of higher concentration.

The polymers obtained by the process of the invention contain in statistical distribution recurring units of Formulae I and II I —[CH₂—CH]—        II —[CH₂—CH]—
         |                      |
         NH                     N—CHO
         |                      |
         CH₃                    CH₃ in an amount of 1 to 100 percent of units of Formula I and 99 to 0 percent of units of Formula II per polymer molecule.

The molecular weight of the poly-N-vinyl-N-methylamines produced by the process of the invention is in the range of from 10,000 to 5,000,000, preferably 20,000 to 1,000,000.

Besides poly-N-vinyl-N-methylformamide water-soluble copolymers of N-vinyl-N-methylformamide with compounds that can be polymerized under the action of free radical catalysts may be used in the process of the invention. Suitable comonomers are, for example, vinyl esters such as vinyl acetate; olefinically unsaturated sulfonic and carboxylic acids and the salts thereof, such as vinylsulfonic acid, sodium vinylsulfonate, acrylic acid and methacrylic acid; as well as other open-chain N-vinyl-amides and N-vinyl-lactams. When copolymers are hydrolyzed parts of the comonomer structural units may naturally be split off. When a N-vinyl-N-methylformamide/vinyl acetate copolymer is completely hydrolyzed a N-vinyl-N-methylamine/vinyl alcohol copolymer is obtained, whereas an uncomplete hydrolysis of the aforesaid copolymer yields a N-vinyl-N-methylformamide/N-vinyl-N-methylamine/vinyl acetate/vinyl alcohol copolymer.

The comonomers are generally used in an amount of from 1 to 100% by weight, preferably 5 to 50% by weight, calculated on the N-vinyl-N-methylformamide.

The copolymers of N-vinyl-N-methylamine obtained by the process of the invention also contain recurring units of the aforesaid Formulae I and II besides units which derive from the comonomer used or its product of hydrolysis.

To bring about a substantial hydrolysis of the formyl radical temperatures in the range of from about 50 to about 120° C. are generally sufficient. The hydrolysis is advantageously carried out at temperatures in the range of about 100° C.

In the hydrolysis according to the invention of poly-N-vinyl-N-methylformamide or copolymers of N-vinyl-N-methylformamide, the formic acid split off first remains with the polymeric amine. It may be removed together with the mineral acid used for hydrolysis, for example in an ion exchanger. In industry this method cannot always be adopted because of the high costs. An especially suitable method then permits the removal of the formic acid by distillation. When prior to or in the course of hydrolysis methanol is added to the reaction mixture in an approximately molar amount, calculated on the monomer unit, the formic acid split off is esterified to give methyl formate, which can be withdrawn at the head of a distillation column, while the unreacted methanol flows back into the mixture of hydrolysis. By the methanol addition the formic acid can be removed in simple manner. Owing to the removal of the formic acid from the equilibrium of hydrolysis simultaneously a somewhat higher degree of hydrolysis is obtained with the same concentration of mineral acid. The formed methyl formate can be readily reacted with methylamine to give N-methylformamide and methanol. The N-methylformamide, after vinylation and polymerization, and the methanol can both be reused in the hydrolysis process.

As already mentioned above, in the process of the invention the basic polymers are obtained in the form of solutions combined with mineral acids. In many fields of application the said solutions can be used as such. In some cases it is advantageous, however, to remove the acid or acid mixture partially or completely. For this purpose the following methods may be used: concentration by evaporation, dialysis and purification by ion exchanger.

When an ion exchanger is used the free bases are obtained in the form of strongly alkaline aqueous solutions from which the basic polymers may be recovered in solid form by evaporation, if necessary under reduced pressure.

Corresponding to their content of vinylmethylamine groupings the hydrolyzed products differ in their properties from the starting polymers. With increasing degree of hydrolysis the brittleness distinctly decreases while the adhesiveness on polyethylene increases.

The polymers produced by the process of the invention are preferably used as additives for detergents and as hardeners for epoxide resins.

The following examples serve to illustrate the invention but they are not intended to limit it thereto.

EXAMPLE 1

25 grams of poly-N-vinyl-N-methylformamide were dissolved in 62 grams of water, 78 grams of concentrated hydrochloric acid (36% by weight) were added to the solution and the mixture was heated for 2 hours with reflux (temperature 108 to 109° C.). After cooling, the solution obtained was passed through a strongly basic ion exchanger to remove hydrochloric and formic acid. After evaporation of the water at 80° C. under reduced pressure a slightly yellow resin was obtained which was a little plastic at room temperature and contained 22.2% by weight of basic nitrogen. Hence, it follows that 93.5 mol percent of the nitrogen was present in the form of free secondary amino groups.

EXAMPLE 2

Two portions of 100 grams each of a 20% solution of poly-N-vinyl-N-methylformamide were hydrolyzed at about 100° C., one portion with 23.5 grams and the other portion with 5 grams of concentrated hydrochloric acid. The reaction mixtures were processed as described in Example 1. The polymers obtained had a content of basic nitrogen of 14.2 and 6.8% by weight, respectively, corresponding to a degree of hydrolysis of 62 and 36%. Within a period of 2 to 8 hours the degree of hydrolysis did not change so that the final stage of hydrolysis had been reached after 2 hours.

EXAMPLE 3

200 grams of a 20% aqueous solution of poly-N-vinyl-N-methylformamide and 33.5 grams of nitric acid (of 88.3% strength) were heated for 8 hours at about 100° C. On cooling, the solution became slightly turbid. It was diluted with water whereby the turbidity disappeared and nitric acid and formic acid were removed in an ion exchanger. After concentration under reduced pressure a water-soluble polymer was obtained having a content of basic nitrogen of 14.3% by weight, corresponding to a hydrolysis of 68%.

EXAMPLES 4 AND 5

Two portions of 100 grams each of a 20% solution of poly-N-vinyl-N-methylformamide were hydrolyzed with 39.7 grams of hydrobromic acid (48% strength) and 27.15 grams of phosphoric acid (85% strength), respectively, for 8 hours at 100° C. The polymers obtained had a content of basic nitrogen of 13.6% by weight and 7.4% by weight, respectively, corresponding to a degree of hydrolysis of 66 and 39%.

EXAMPLE 6

100 grams of a 20% solution of poly-N-vinyl-N-methylformamide and 200 grams of hydrochloric acid of 30% strength were heated at about 105° C. for 10 hours while stirring. The aqueous hydrochloric acid and formic acid were removed by evaporation in a rotary evaporator under a pressure of 20 mm. of mercury until the reaction product was dry. The hydrochloride obtained was dissolved in water and precipitated again with methanol. The purified product had a chlorine content of 33.9% by weight whereas the product which had not been reprecipitated had a chlorine content of 38.5% (theoretical Cl content with complete hydrolysis 38.2%).

EXAMPLE 7

77.5 grams of gaseous HCl were introduced into 525 grams of a 35% solution of poly-N-vinyl-N-methylformamide and the mixture obtained was heated at 100° C. for a short period of time. The mixture was cooled to about 70° C., 69.5 grams of methanol were added and the solution was heated for 7 hours and 20 minutes with slowly increasing internal temperature. The flask with stirrer used for this purpose was provided with a fractionating column. With possible change of the reflux ratio a distillate having a boiling point of 31 to 34° C. was continuously removed during the reaction until the internal temperature amounted to about 99° C. In a subsequent fine distillation of the distillate 105 grams of methylformate boiling at 31.5 to 33° C. under 760 mm. of mercury were obtained, corresponding to a degree of hydrolysis of 81%. This value can be considered only as lower limit. When the amine was recovered from the reaction solution with an ion exchanger a content of basic nitrogen of 18.8% by weight was found, corresponding to a hydrolysis of the formamide groups of 83%. When the same experiment was carried out under analogous conditions without the addition of methanol (same period of time and same temperature), the polymeric amine contained 17.3% of basic nitrogen corresponding to a hydrolysis of 78%.

EXAMPLE 8

In the manner described in the preceding example a copolymer of N-vinyl-N-methylformamide and sodium vinyl-sulfonate (90/10% by weight) was hydrolyzed with hydrochloric acid with the addition of methanol. 67% by weight of the amount of formic acid calculated for a complete hydrolysis were withdrawn at the head of the column in the form of methyl formate. Hence, it follows that at least 67% of the formamide groups of the copolymer were hydrolyzed in this experiment.

COMPARATIVE EXAMPLE

In a bomb tube 75 grams of a 20% solution of poly-N-vinyl-N-methylacetamide and 3 milliliters of concentrated sulfuric acid were heated for 20 hours at 150° C. The reaction mixture was treated in an ion exchanger whereupon a polymer containing 8.9% of basic nitrogen was obtained, corresponding to a degree of hydrolysis of 46%.

As compared with the above known process, the process of the invention presents a number of advantages, such as shorter time of hydrolysis, lower temperature of hydrolysis and working at atmospheric pressure. It is thus not necessary to use a bomb tube. In general the yield of hydrolysis product is considerably higher than in the known process.

What is claimed is:
1. A process for the manufacture of poly-N-vinyl-N-methylamides which comprises hydrolyzing water-soluble polymers consisting essentially of units derived from N-vinyl-N-methylformamides in aqueous solution with a strong mineral acid at a temperature within the range of from about 50° C. to about 120° C. and recovering the poly-N-vinyl-N-methylamine formed.

2. A process for the manufacture of poly-N-vinyl-N-methylamine which comprises hydrolyzing a water-soluble homopolymer of N-vinyl-N-methylformamide in aqueous solution with a strong mineral acid at a temperature within the range of about 50° C. to about 120° C. and recovering the poly-N-vinyl-N-methylamine formed.

3. A process for the manufacture of poly-N-vinyl-N-methylamine which comprises hydrolyzing water-soluble polymers consisting essentially of units derived from N-vinyl-N-methylaformamide in an aqueous reaction medium containing a strong mineral acid and methanol at a reflux temperature to form said poly-N-vinyl-N-methylamine and methylformate, continuously removing methylformate from the reaction medium by distillation and recovering the poly-N-vinyl-N-methylamine from the distillation residue.

References Cited

FOREIGN PATENTS 1,082,016  8/1964  Great Britain ------- 260—89.7
1,115,021  10/1964  Germany ---------- 260—89.7

OTHER REFERENCES

"Cleavage Reactions," taken from "Chemical Reactions of Polymers"—"High Polymers," vol. XIX, article by Ravens et al., pp. 554–564.

JOSEPH L. SCHOFER, Primary Examiner

W. F. HAMROCK, Assistant Examiner

U.S. Cl. X.R.

260—79.3, 80.3, 80.73, 85.7, 86.1